April 15, 1952  R. DOUSSAIN  2,592,796
ELASTIC COUPLING AND TORQUE MEASURING DEVICE
Filed March 8, 1946  3 Sheets-Sheet 1

Inventor
ROBERT DOUSSAIN
By
Singer, Ehlert, Stern & Carlberg
Attorneys

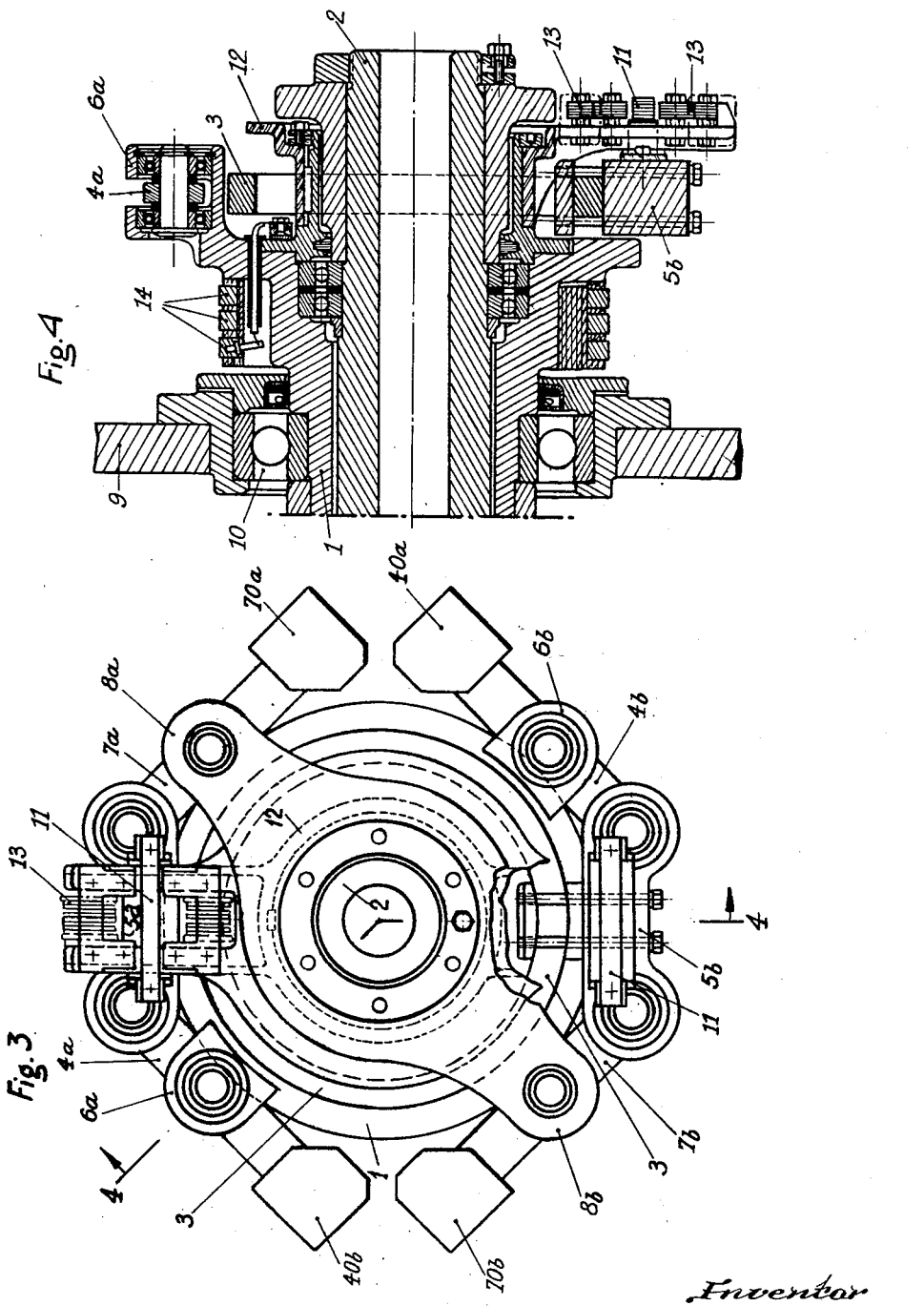

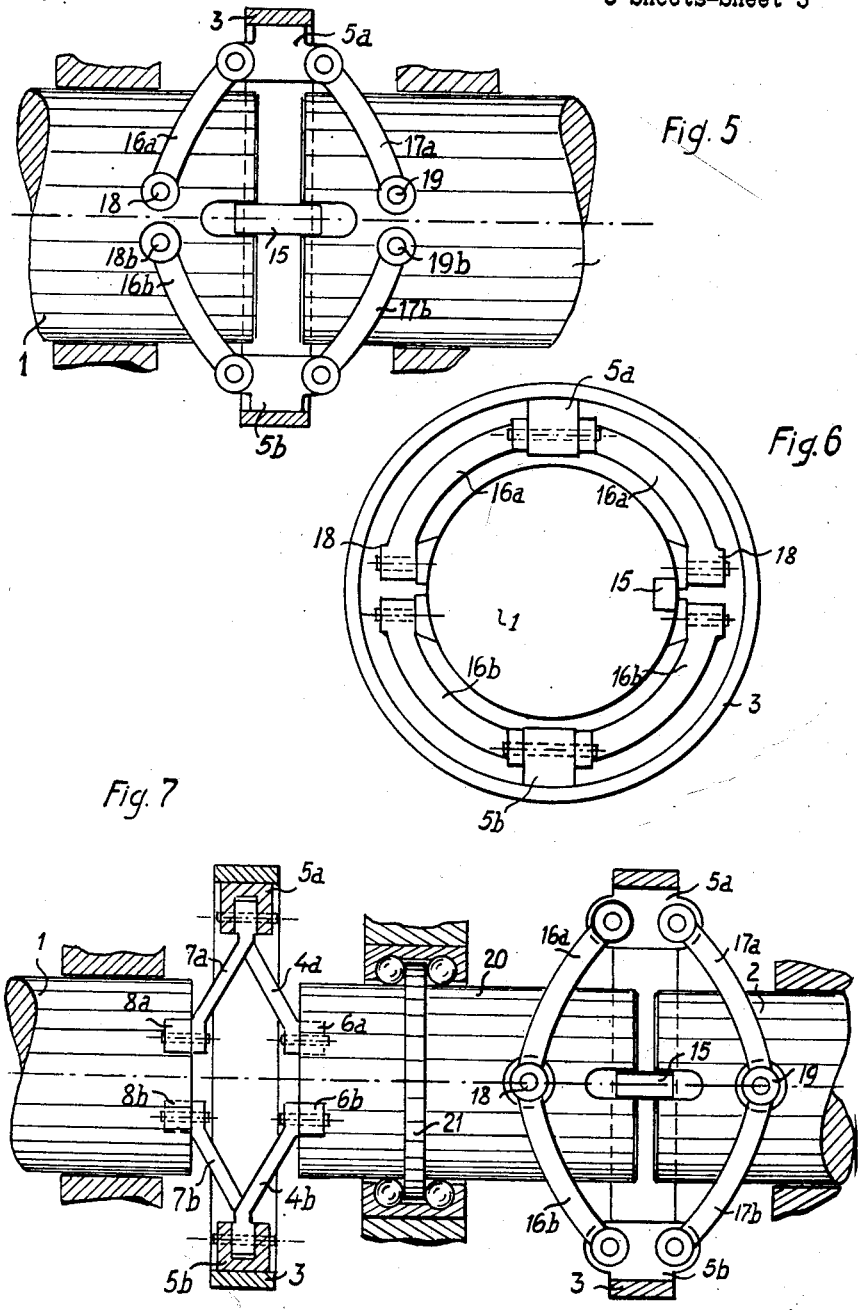

Patented Apr. 15, 1952

2,592,796

UNITED STATES PATENT OFFICE 2,592,796

ELASTIC COUPLING AND TORQUE MEASURING DEVICE

Robert Doussain, Villeurbanne, France

Application March 8, 1946, Serial No. 653,198
In Germany March 12, 1942

6 Claims. (Cl. 73—136)

This invention relates to elastic couplings between two co-axial shafts and has for its object the provision of a coupling device that is compact, statically and dynamically balanced with or without load, and capable of transmitting a broad range of efforts (for instance, in the case of a torque transmitting coupling device, torques between a couple of kg./meters and a top limit such as 1500 kg./meters).

Moreover, the combination of such a coupling device with measuring means will permit the measuring in an exact and simple way of the efforts transmitted from the driving shaft of a motor to a driven shaft without modification of the internal structure of the motor.

The coupling according to the invention comprises at least one elastic metal ring concentric with the shafts and connected to them by a statically and dynamically balanced device, said balance being maintained under all deformations of the ring due to the transmitted efforts.

The use of elastic metal rings for the transmission of efforts between two co-axial shafts presents numerous advantages:

(a) The rings, while compact, have considerable load capacity. For instance, a ring with a mean radius of 17 cm., a width of 10 mm. and a thickness of only 45.8 mm. is subjected to a diametral deformation of 1 mm. for a 5,000 kg. load. Should the width be increased to 60 mm., the ring could bear a load of 30,000 kgs. for the same deformation of 1 mm.

(b) It is easy to calculate very exactly the deformation of a ring for a given load.

(c) The manufacturing of a circular ring with preferably rectangular cross section is simple.

(d) It is possible to group several concentric rings by fixing them one to the other so that they will be submitted simultaneously to the compression or extension efforts, the complete arrangement admitting a useful load capacity corresponding to the sum of the individual useful loads of the rings.

According to the invention the connecting device, which as already described, is based on the use, for the transmission of the efforts between two co-axial shafts, of a ring concentric with these shafts and connected to them so that the transmitted efforts would deform it (conforming to existing laws of flexion or of torsion), thus forms a rotating system, compact, balanced by construction both statically and dynamically, with or without load, and applicable to a very broad range of torques ranging for instance, from a couple of kg./meters to 1,500 kg./meters.

It is important to note that for the measurement of transmitted efforts the static and dynamic balance of the system can be maintained whatever the deformation produced by the transmitted efforts, this feature being important mainly when periodically irregular torques are transmitted. When the connecting device is combined with an appropriate measuring device, this property also permits the instantaneous measuring of variable torques while damping or permitting control of the resonance phenomenon.

Another object of the invention is the provision of the co-axial rings for the transmission of longitudinal efforts between two shafts, the axes of which are in alignment.

The invention is illustrated in the accompanying drawings in which:

Fig. 3 is an end view of a practical arrangement of the coupling device, combined with a torque measuring device.

Fig. 4 is a longitudinal sectional view taken on line 4—4 of Fig. 3.

Fig. 5 is a longitudinal sectional view of a device for transmitting longitudinal efforts between two co-axial shafts.

Fig. 6 is a diagrammatic end view corresponding to Fig. 5.

Fig. 7 is a longitudinal sectional view of a device for the transmission of torque and of longitudinal efforts between two co-axial shafts.

Figure 1:
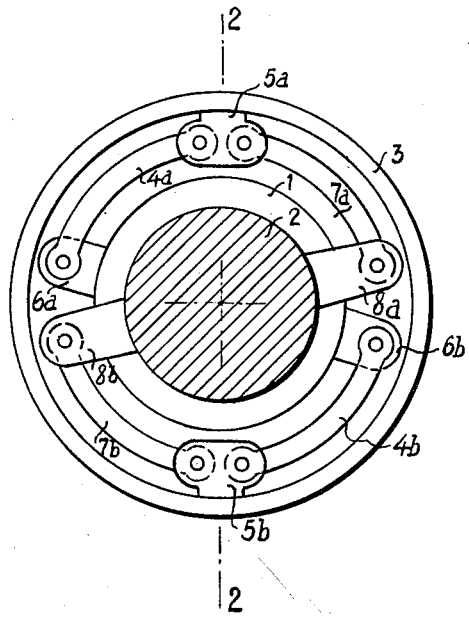
Fig. 1 is a cross sectional view of a coupling device embodying the invention, the section being taken on the line 1—1, Fig. 2.
Figure 2:
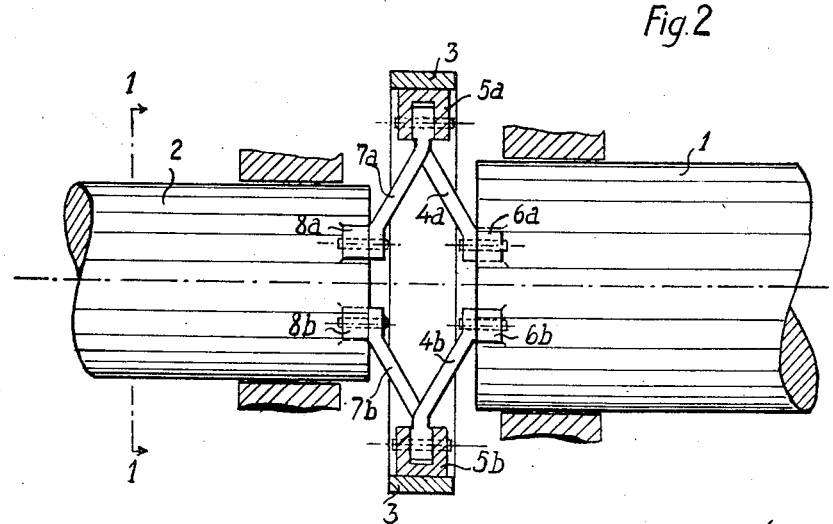
Fig. 2 is a longitudinal section on line 2—2 of Fig. 1.

Referring to Figs. 1 and 2, it is assumed that shaft 1 is the driving shaft, and shaft 2 the driven shaft. According to the invention, the coupling of these two shafts is obtained by means of a ring 3 concentric to the shafts 1 and 2. Two small connecting rods 4a and 4b are inserted between this ring 3 and the driving shaft 1, each rod pivoting at one end around a forked lever 6a or 6b carried by the shaft 1, and at the other end on a part 5a or 5b rigid with the ring 3.

In a similar way, the ring 3 is connected to shaft 2 by connecting rods 7a and 7b pivoted at one end to levers 8a and 8b of shaft 2 and at the other end to the connection members 5a and 5b of ring 3.

By such a disposition the transmission of a torque from the shaft 1 to the shaft 2 exerts a diametral effort on the ring 3 following a line passing through the parts 5a and 5b, this effort being an extension effort when, with a disposition such as in Fig. 1, the shafts rotate clockwise, and a contraction effort when they rotate counterclockwise.

Moreover, the deformation of the ring allows an exact and easy calculation of the value of the efforts to which it is submitted, by combining the above described coupling device with a device for measuring said deformations. Figs. 3 and 4 exemplify such a torque measuring device.

In these figures the driving shaft 1 is provided with the forked levers 6a and 6b, diametrically opposed one to the other, and to said levers two small connecting rods 4a and 4b are linked symmetrically in relation to the axis of the shaft 1.

The shaft 2, driven co-axially inside the shaft 1, is provided with two forked levers 8a and 8b diametrically opposed one to the other, and to said levers two small connecting rods 7a and 7b are linked symmetrically in relation to the common rotating axis of the shafts 1 and 2.

The linking axes of the small connecting rods with the forked levers 6a and 8a, 6b and 8b are located on a circle concentric with the common axis of the shafts 1 and 2, and parallel to this axis. The four small connecting rods in question are located in a common plane perpendicular to this axis. As previously stated, the small connecting rods 4a and 7a are linked to the part 5a, while the small connecting rods 4b and 7b are linked to the part 5b, the parts 5a and 5b being fixed on the ring 3 concentric to the shafts 1 and 2.

As explained with reference to Figs. 1 and 2, the torque transmitted from the shaft 1 to the shaft 2 by means of the connecting rod systems 4a—7a—5a on one side and 4b—7b—5b on the other, constantly produces diametral elastic deformation of the ring 3, the characteristics of which can be determined theoretically or experimentally according to the sort of the torques transmitted and according to whether a loose or a close coupling is required. The deformation of the ring 3 can be measured by any appropriate means, electromagnetic, stroboscopic, etc.

For instance, as seen in Figs. 3 and 4, each of the parts 5a and 5b carries a core 11, while the shaft 1 carries coils 13 by means of a ring 12, said coils being adapted to cooperate with the cores 11. The displacement of the core 11 resulting from the deformation of the ring 3 is measured by the variations of the current received on the collector rings 14.

It will be noticed that the small connecting rods 4a, 7a, 4b, 7b are balanced around their linking axes with the forked levers 6a—8a—6b—8b by means of the counterweights 40a—70a—40b—70b.

Under certain conditions, such as after the statical balancing that has just been described, the dynamical balance under the action of centrifugal forces is good for all normal deformations of the ring, whatever the torque may be. The elastic coupling system just described admits certain parameters upon which it is possible to act, for instance:

(a) The radius of the circle through the linking axes of the forked levers 6a—8a—6b—8b.

(b) The length of the small connecting rods 4a—7a—4b—7b.

(c) The geometrical elastic characteristics of the ring 3.

A judicious choice of these parameters permits control of the transmitted torque, to dampen it if necessary and to render the coupling loose or close.

Torque measuring systems, an example of which has just been described, are applied very advantageously in the aircraft industry, but they can also be used in connection with most types of engines as they do not modify their internal structure.

They can be applied profitably to the measurement of high loads under small volume, as found in the aircraft industry, and permit measurement of the torque during flight as well as on the ground on a test bank.

The detection of torques according to the last described embodiment permits synchronization or regulation of the engines according to the desired laws and much more accurately than by the use of a differential gear system.

Particularly, the device shown in Figs. 3 and 4 facilitates the comparison of two torques according to any desired law that differs from the simple equality law. Figs 5 and 6 show the manner in which an elastic metal ring can be applied to the transmission of longitudinal efforts between two co-axial shafts. In this case the shafts 1 and 2 are angularly connected by means of a key 15. Each one of the shafts is connected to the ring by means of small connecting rods 16a—16b—17a—17b linked on one side in 18a—18b—19a—19b to the shafts 1 and 2 and on the other to the parts 5a and 5b rigid with the ring 3.

Under these conditions the longitudinal effort transmitted from one shaft to the other produces a diametral deformation extension or contraction) of the ring 3.

The advantages noted hereinbefore with reference to use of elastic metal rings and the measurement of its deformations also apply to the arrangement shown in Figs. 5 and 6.

Finally, Fig. 7 shows the combination of an elastic coupling and a longitudinal effort transmitting device from a shaft 1 to a shaft 2 by means of two devices similar to those of Figs. 1 and 2, on one side, and to those of Figs. 5 and 6, on the other.

Although a preferred embodiment has been described herein, some changes may be made in the arrangement, construction and combination of the various parts of the above described coupling device by those skilled in the art without departing from the spirit of the invention, and it is intended that the same shall come within the scope of the invention, as defined in the appended claims.

What I claim is:

1. An elastic coupling device for transmitting torques between two co-axial shafts, comprising an elastic metal ring concentric with said two shafts and having two diametrically opposed connection members, two diametrically opposed levers integral with and projecting from each of said shafts, a first pair of connecting rods pivoted at one end to one of said connection members about axes parallel to the common axis of the two shafts, a second pair of connecting rods pivoted at one end to the other of said connection members about axes parallel to the common axis of the two shafts, the other ends of the two first-mentioned connecting rods being pivoted each to one of said two levers of each shaft and the other ends of the two last-mentioned connecting rods each to the other of said two levers of each shaft about axes parallel to the common axis of the two shafts.

2. An elastic coupling device for transmitting torque between two co-axial shafts, comprising an elastic metal ring concentric with said two shafts and having two diametrically opposed connection members, a first pair of connecting rods pivoted at one end to one of said connection members about axes parallel to the axis of said shafts and each at a point intermediate its length respectively to one of said shafts about an axis parallel to the axis of said shafts, a second pair of connecting rods pivoted at one end to the other of said connection members about axes parallel to the axis of said shafts and each at a point intermediate its length to the other of said shafts about an axis parallel to the axis of said shafts, and counterweights provided at the other end of each of said connecting rods for counterbalancing same.

3. An elastic coupling device for transmitting torque between two co-axial shafts, comprising an elastic metal ring concentric with said two shafts and having two diametrically opposed connection members, a first pair of connecting rods pivoted at one end to one of said connection members about axes parallel to the axis of said shafts, one rod of said first pair of connecting rods being pivoted at a point intermediate its length to one of said shafts about an axis parallel to but spaced from the axis of said shaft, the other rod of said first pair of connecting rods being pivoted at a point intermediate its length to the other of said shafts about an axis parallel to but spaced from the axis of said shaft, a second pair of connecting rods pivoted at one end to the other of said connection members about axes parallel to the axis of said shafts, one rod of said second pair of connecting rods being pivoted at a point intermediate its length to said one of said shafts about an axis parallel to but spaced from the axis of said shaft and diametrically opposite the axis about which said one rod of said first pair of connecting rods is pivoted, the other rod of said second pair of connecting rods being pivoted at a point intermediate its length to said other of said shafts about an axis parallel to but spaced from the axis of said shaft and diametrically opposite the axis about which said other rod of said first pair of connecting rods is pivoted, and counterweights secured to the other end of each of said connecting rods for counterbalancing same.

4. An elastic coupling device for transmitting torque between two co-axial shafts, comprising an elastic metal ring concentric with said two shafts and having two diametrically opposed connection members, a first pair of connecting rods pivoted at one end to one of said connection members about axes parallel to the axis of said shafts and each at a point intermediate its length to one of said shafts about an axis parallel to the axis of said shafts, a second pair of connecting rods pivoted at one end to the other of said connection members about axes parallel to the axis of said shafts and each at a point intermediate its length to the other of said shafts about an axis parallel to the axis of said shafts, whereby upon transmission of torque between said two shafts a diametral force is exerted upon said elastic metal ring causing diametral movement thereof, an annular member carried by one of said shafts, a core carried by each of said connection members, coils mounted upon said annular member adjacent each of said cores and cooperating therewith, and electrical means for measuring the displacement of said cores with respect to said coils caused by the diametral movement of said ring.

5. An elastic coupling device for transmitting torque between two co-axial shafts, comprising an elastic metal ring concentric with said two shafts and having two diametrically opposed connection members, a first pair of connecting rods pivoted at one end to one of said connection members about axes parallel to the axis of said shafts, one of said first pair of connecting rods being pivoted at a point intermediate its length to one of said shafts about an axis parallel to the axis of said shaft, the other of said first pair of connecting rods being pivoted at a point intermediate its length to the other of said shafts about an axis parallel to the axis of said shaft, a second pair of connecting rods pivoted at one end to the other of said connection members about axes parallel to the axis of said shafts, one of said second pair of connecting rods being pivoted at a point intermediate its length to said one of said shafts about an axis parallel to the axis of said shaft and diametrically opposite the axis about which said one of said first pair of connecting rods is pivoted, the other of said second pair of connecting rods being pivoted at a point intermediate its length to said other of said shafts about an axis parallel to the axis of said shaft and diametrically opposite the axis about which said other of said first pair of connecting rods is pivoted, whereby upon transmission of torque between said two shafts a diametral force is exerted upon said elastic metal ring causing diametral deformation thereof, counterweights secured to the other end of each of said connecting rods for counterbalancing same, an annular member carried by one of said shafts, a core carried by each of said connection members, coils mounted upon said annular member adjacent each of said cores and cooperating therewith, and electrical means for measuring the displacement of said cores with respect to said coils due to the deformation of said ring.

6. An elastic coupling device for transmitting torque between two co-axial shafts, comprising at least one elastic metal ring concentric with said two shafts and having two diametrically opposed connection members, a pair of diametrically opposed arms carried by each of said shafts and positioned at substantially 90° with respect to said connection members, a first pair of connecting rods pivoted at one end to one of said connection members about slightly spaced axes which are parallel to the axis of said shafts, and a second pair of connecting rods pivoted at one end to the other of said connection members about slightly spaced axes which are parallel to the axis of said shafts, the other ends of said first pair of connecting rods being pivoted one to one of said arms of one shaft and the other to one of said arms of the other shaft, the other ends of said second pair of connecting rods being pivoted to the other arms of said shafts, whereby upon transmission of torque between said two shafts a diametral force is exerted upon said elastic metal ring causing diametral deformation thereof.

ROBERT DOUSSAIN.

REFERENCES CITED

The following references are of record in the file of this patent:

UNITED STATES PATENTS

| Number | Name | Date |
|---|---|---|
| 268,807 | Landis | Dec. 12, 1882 |
| 1,181,902 | Lessert et al. | May 2, 1916 |
| 1,778,170 | Smith et al. | Oct. 14, 1930 |
| 1,857,688 | Mackenzie | May 10, 1932 |
| 2,049,330 | Smith, Jr. | July 28, 1936 |
| 2,173,039 | Muir | Sept. 12, 1939 |

FOREIGN PATENTS

| Number | Country | Date |
|---|---|---|
| 98,397 | Switzerland | Mar. 19, 1940 |